United States Patent [19]

Kato

[11] Patent Number: 4,688,503

[45] Date of Patent: Aug. 25, 1987

[54] PATTERN SELECTING DEVICE FOR A SEWING MACHINE

[75] Inventor: Kenji Kato, Hachioji, Japan

[73] Assignee: Janome Sewing Machine Co. Ltd., Tokyo, Japan

[21] Appl. No.: 855,187

[22] Filed: Apr. 22, 1986

[30] Foreign Application Priority Data

Apr. 26, 1985 [JP] Japan .................................. 60-88932

[51] Int. Cl.<sup>4</sup> ............................................. D05B 3/02
[52] U.S. Cl. .................................... 112/445; 112/454; 112/458
[58] Field of Search ............... 112/445, 453, 454, 457, 112/121.11, 121.12, 458

[56] References Cited

U.S. PATENT DOCUMENTS 4,499,836 2/1985 Meier et al. .......................... 112/445
4,557,207 12/1985 Turner et al. .................... 112/454 X
4,590,880 5/1986 Makabe et al. ...................... 112/445

Primary Examiner—Peter Nerbun
Attorney, Agent, or Firm—Michael J. Striker

[57] ABSTRACT

A pattern selecting device for a sewing machine is disclosed in which a display means is provided. The display means includes a visible cursor movable past indicia means in response to operation of a search means. When a desired indicia is designated by the cursor, input means are used to register the selection. A display drive means is responsive to registration of a predetermined number of symbols selected for presentation on the display means to cause the display means to represent a stitch pattern stored in the memory and corresponding to the predetermined number of symbols.

6 Claims, 6 Drawing Figures

FIG_1
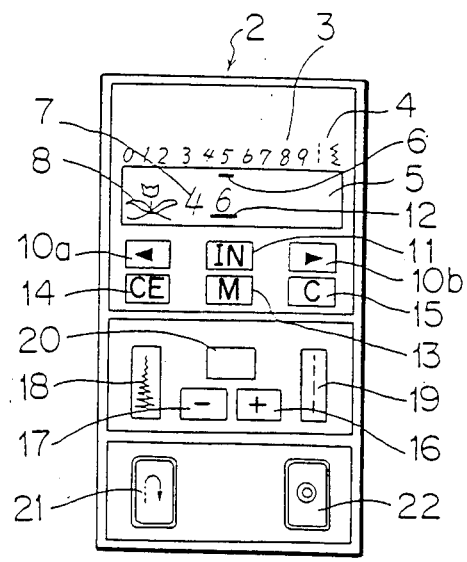
FIG_2
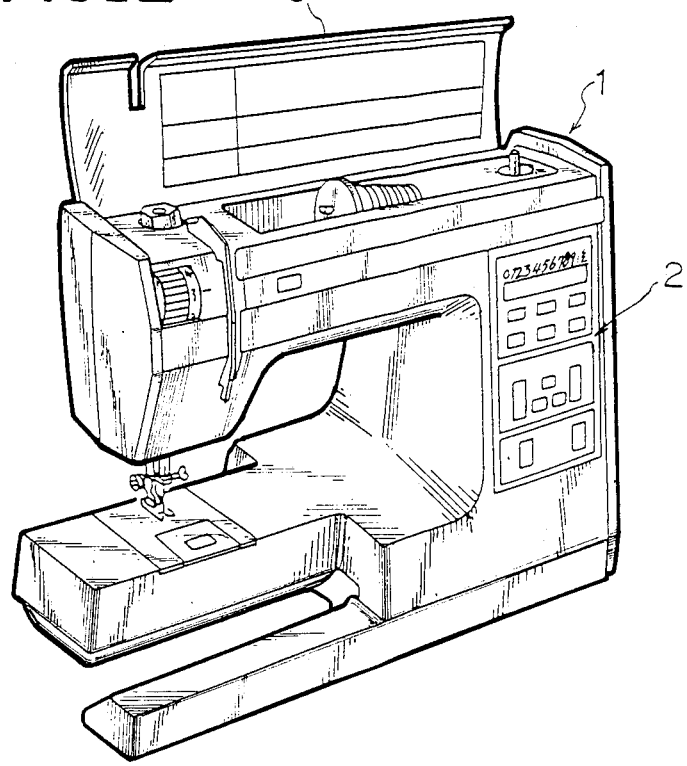

FIG_3
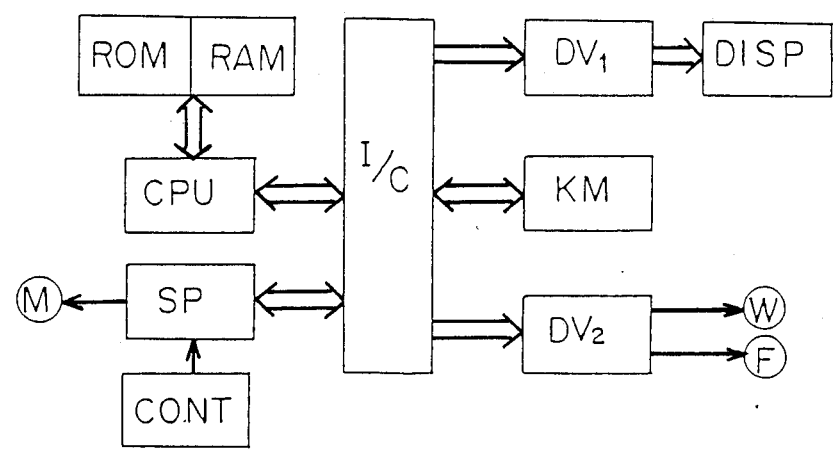

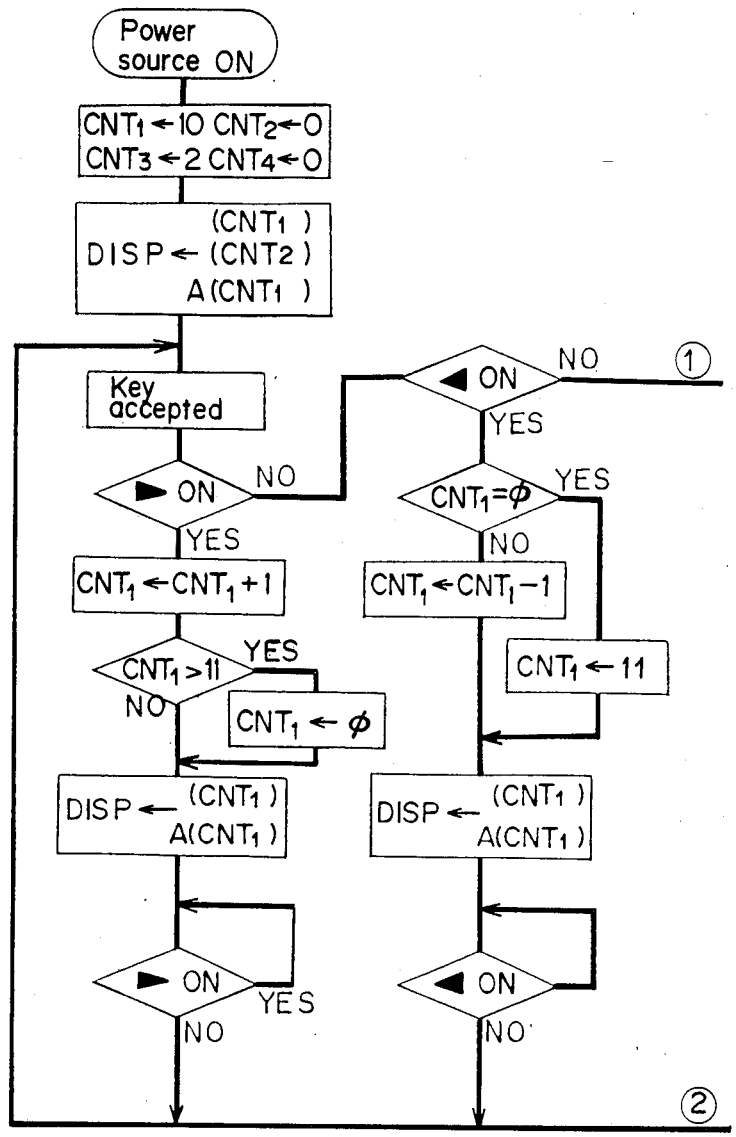
FIG_4(A)

FIG_4(B)
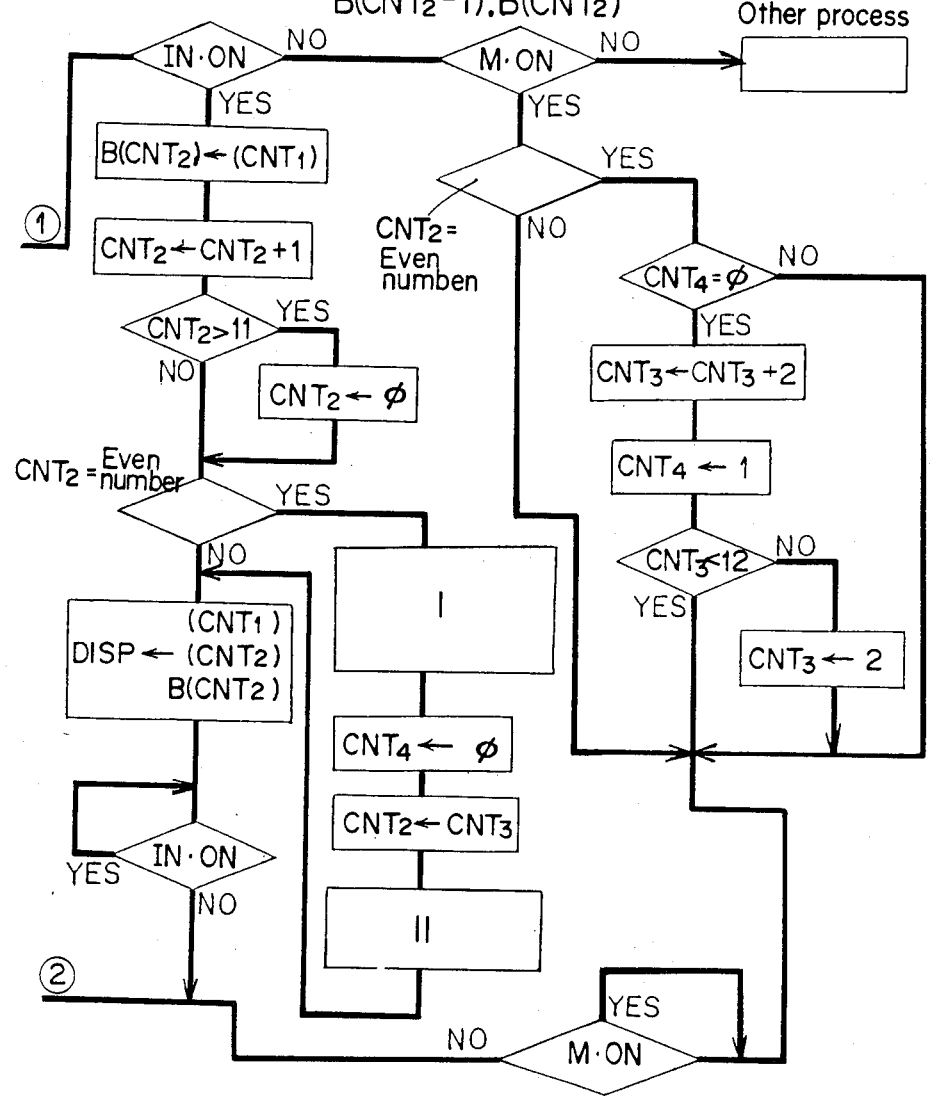

FIG_5
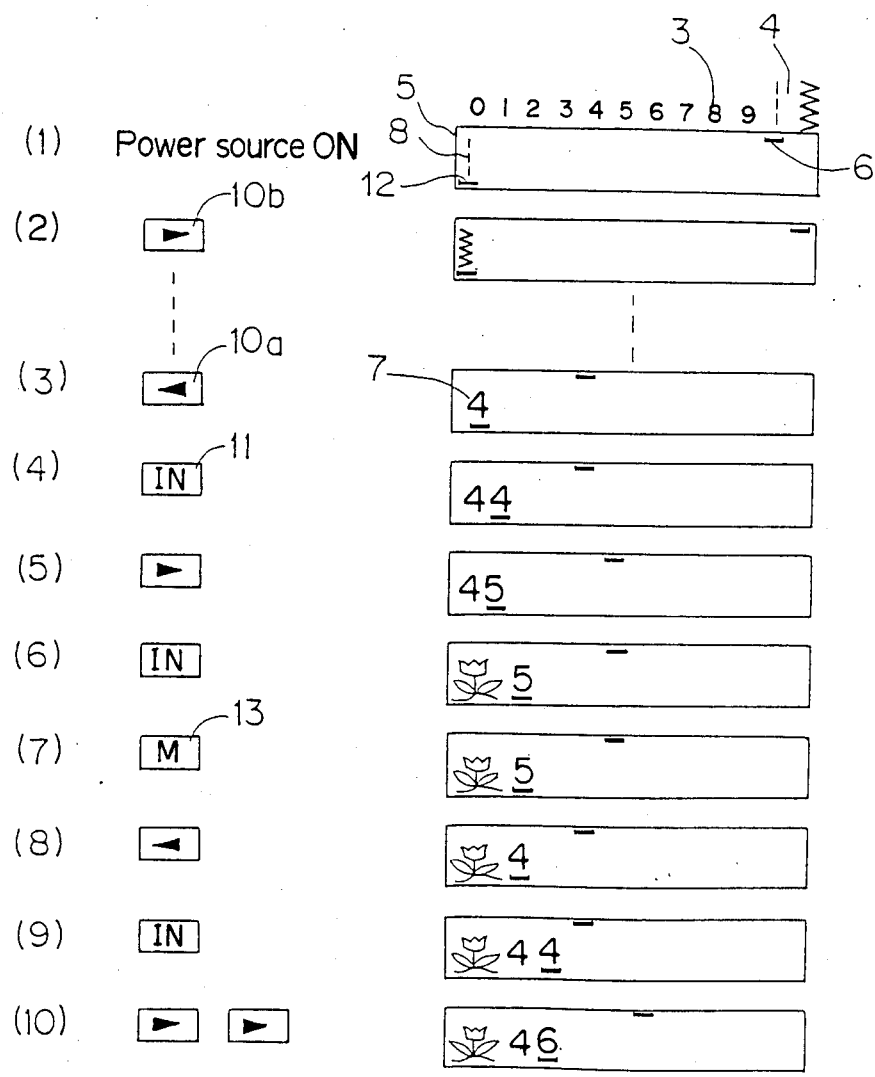

PATTERN SELECTING DEVICE FOR A SEWING MACHINE

BACKGROUND OF THE INVENTION

The present invention relates to a pattern selecting device for a sewing machine.

When a pattern is selected from a group of patterns in a computer sewing machine, a number corresponding to a desired pattern is designated by a tenkey with reference to a table showing a number of different patterns to be formed and numbers specific to the respective patterns, and a designated number is shown by a 7 segment LED indicator. After the selection, it is desired that the correspondence therebetween be once again confirmed. Especially, when a plurality of patterns have been selected to be formed in combination, it is not realized if the desired patterns have been correctly selected until the stitching is finished.

There has been a proposal for displaying a selected pattern by a plurality of pattern selection switches with a liquid crystal, but it is not preferable in view of a space in a sewing machine or a production cost to provide the plurality of pattern selection switches, the number indicator and the liquid crystalline indicator.

SUMMARY OF THE INVENTION

In the present invention, for a pattern selection and an indication thereof, there is arranged indicia including digit numbers 0 to 9, and additionally, if required, some standard stitch patterns including a straight stitch pattern and a zigzag pattern, all arranged in a row in a panel provided on the front side of the sewing machine. A visible display, such as liquid crystal, is provided and extended in parallel with the row of the digit numbers and the patterns. When a power source is supplied, the straight stitches, for example herein, are selected, and a visible cursor is positioned at the straight stitch pattern to show that the pattern has been selected. When search keys are operated, the cursor is moved in response to the operation to selectively designate the digit numbers or the patterns. When an input designation key is operated, the designated digit number is registered. Further, when the search key is operated, another digit number or pattern is designated similarly. Thus a number of a determined number of figures (actually two-figure) specific to a selected pattern is designated. When the input designation key is operated again, a pattern corresponding to the two-figure number is shown in the display.

BRIEF DESCRIPTION OF THE DRAWINGS

FIG. 1 is a front view of an operating panel, showing an embodiment of the invention;

FIG. 2 is a perspective view showing a whole of the sewing machine;

FIG. 3 is a block diagram of a control circuit;

FIGS. 4A and 4B are a flow chart for control; and

FIG. 5 is an explanatory view of operation;

DETAILED DESCRIPTION OF PREFERRED EMBODIMENT

An explanation will be made to an embodiment of the invention with reference to the attached drawings.

In FIG. 2, an operating panel 2 attached to a front part of a sewing machine 1 is printed with indicia 3 of digit numbers 0 to 9, and basic stitching patterns 4 including a straight stitch pattern and a basic zigzag stitch pattern, all arranged in a row. Adjacent thereunder as seen in FIG. 1, a liquid crystalline display 5 of a full dot type is provided as extended in parallel with the indicia 3, 4 for showing therein the numbers and patterns designated by a pattern selection. According to the embodiment, two digit numbers are selectively designated to select the corresponding pattern to be stitched. Otherwise a pattern 8 of the indicator 4 is directly designated.

A top plate 9 is printed, on its reverse side, with a table showing patterns and pattern numbers each specific thereto (not shown).

As shown in FIG. 5 (1)–(3), when a left feed search key 10a or a right feed search key 10b is operated for pattern selection, a cursor 6 is moved leftward or rightward stepwise along the indicia 3, 4 to selectively designate a digit number or a pattern of the indicia to thereby represent the designated number or a pattern in the display 5. After the cursor 6 reaches one end of the indicia 3,4, it returns to an initial position.

As shown in FIG. 5 (4), an input designation key 11 is then operated to register the number of the represented indicators 3, 4 or the represented pattern of the indicia while the cursor 6 is positioned opposite is designated digit number or pattern, and if the registered one is an initially designated number for selecting a desired pattern, the number is advanced by one figure, and subsequently the search key 10a (10b) is made effective for designating a number of a subordinate figure of the registered number.

The display 5 includes another cursor 12 for showing that the represented number or pattern of the indicia 3, 4 may be optionally changeable. When the subordinate number is designated, the input designating key 11 is operated again to register the number. Then the pattern corresponding to the two-figure number is represented in the display 5 as shown in FIG. 5.

A memory key 13 selects a plurality of patterns in association with keys 10a, 10b, 11 for storing said patterns in order.

A read-out key 14 is to read out any one of said stored patterns, and replace another desired pattern there.

A clear key 15 is to clear operation of the keys. A plus key 16 and a minus key 17 are operated in association with an amplitude manual key 18 or a feed manual key 19 for adjusting increase or decrease of the needle amplitude amount or the fabric feed amount. A number indicator 20 shows luminously each of said amounts. A locking stitch stitch key 21 and a finish-up stitch key 22 designate a locking stitch and a finish-up stitch, respectinely.

FIG. 3 is a block diagram of a control circuit, in which a micro-computer is composed of a central processing unit (CPU), read-only memory (ROM), random-access-memory (RAM) and input-output port (I/O). A key matrix (KM) is composed of keys including the keys 10a, 10b, 11, 13, and inputs operating signals thereof into the micro-computer.

A display (DISP) includes the indicator 5, and luminously shows a process of said pattern selection and a result thereof. A display activating device (DV1) is controlled by the micro-computer for indicating and activating the display (DISP). With respect to the pattern selection, the display activating device (DV1) receives control data calculated by the micro-computer, and indicates the cursol 6, the pattern number 7 and the pattern 8 in the indicating device (DISP), in accordance with the designation of the keys 10a, 10b, 11, 13. A stepping motor drive device (DV2) receives control data read out by the micro-computer as selected with operation the keys 10a, 10b, 11, 13, and drives step motors (W), (F) for swinging the needle and feeding the fabric so as to control the stitches of or selected pattern or patterns. A speed control circuit (SP) drives a machine motor (M) by the control of the micro-computer in response to the operation of the machine controller (CONT).

A further explanation will be made to actuation of the above mentioned structure with reference to FIGS. 4 and 5. When a power source is turned ON, a program control is started, and each of the control elements is set initially. The straight stitch is automatically selected in this sewing machine. In reference to FIG. 5 (1) a cursor counter (CNT1) is for designating a position of the cursor 6 and is set at 10 which corresponds to the number 10 of the indicia 3, 4. Another cursor counter (CNT2) is for designating a position of the cursor 12, and is set at 0 which corresponds to the number 0 of the indicia 3, 4. A memory counter (CNT3) is set at 2 so as to designate the indicating positions in correspondence to the predetermined number of the indicia 3, 4 as a plurality of patterns may be memorized by the operation of a memory key 13.

A memory flag (CNT4) designates actuating conditions of the memory counter (CNT3), and is set at 0. The display (DISP) shows that the cursor 6 of the indicator 5 is set by CNT1=10 at the position of the straight stitching of the basic stitch indicia 4, and the cursor 12 is positioned by CNT2=0 at the number 0 of the indicia 3, 4, and the straight stitching is shown as the pattern 8 at a corresponding position of the cursor 12 of the indicator 5, i.e., the left end by an indication in response to the counter (CNT1) (which will be shown with A (CNT1) ), and that the cursor 12 may change the patterns by a subsequent key operation.

When the keys 10a, 10b, 11, 13 are operated for selecting new patterns, they are accepted. When the right feed search key 10b is once operated, the cursor counter (CNT1) is positioned at 11, and the cursor 6 is set at a position of a basic zigzag stitching pattern as shown in FIG. 5 (2), and the pattern 8 is changed to the basic zigzag stitching pattern. The right feed search key 10b is turned OFF, for example, when the left feed key 10a is operated, the cursor counter (CNT1) is subtracted per each of the operations, and the cursor 6 is moved to the left in succession as shown in FIG. 5 (3) and comes to CNT2=4 by operations of 7 times. When the left feed key 10b is turned OFF and the operating key 11 is operated, the content of the cursor counter (CNT1) enters a register (B (CNT2) ) which is to store the number of the indicia (3) designated by the counter (CNT2). The counter (CNT2) is added and becomes CNT2=1, and as shown in FIG. 5 (4) the cursor 12 is advanced and is indicated with "4".

When the input designation key 11 is turned OFF and the right feed key 10b is, for example, once operated, it becomes CNT1=5, and the cursor 6 comes to "5" of the indicia 3, and the number "4" of the cursor 12 of FIG. 5 (4) advances to "5" as seen in FIG. 5 (5). When the input designation key 11 is operated, the content CNT1=5 of the cursor counter (CNT2) enters the register (B (CNT2)), and becomes CNT2=2, that is, an even number. Then, a pattern data is calculated in correspondence to the number of two figures, i,e., 45 by the data to be determined by B (CNT2-1) and (B (CNT2)) from the data of the register (B (CNT2)). Assume that this pattern is a tulip.

The memory flag becomes CNT4=0, and the data 2 of the memory counter (CNT3) enters the cursor counter (CNT2). As seen in FIG. 5 (6), a tulip pattern is displayed in a space of two figures of the cursor 6. The cursor 6 is positioned at "2" of the indicia 3, and a number to be displayed there is "5" at the position of the cursor 6.

When the memory key 13 is operated, and since the data of the counter (CNT2) is an even number and the flag (CNT4) is 0, the memory counter (CNT3) advances by 2 and becomes 4. The flag (CNT4) is 1 and the memorization is finished, and a new pattern is selected for preparing a next designation. This condition is shown in FIG. 5 (7). When the left feed key 10a is operated, the number is decreased as shown in FIG. 5 (8). When the input designation key 11 is operated, the number is advanced as shown in FIG. 5 (9). If the right feed key 10b is, for example, twice operated, the pattern number 46 is selected and shown as shown in FIG. 5 (10). For showing a pattern of the pattern number 46, though not illustrated, it is sufficient to operate the memory key 13.

As mentioned above, according to the present invention, it is not required to provide a lot of operating keys for selecting many patterns. The pattern number is designated for selecting a desired pattern as indicating said pattern number. Since the selected patterns may be confirmed in order, the operationability is high and the space of the operating parts may be relatively reduced.

What is claimed is:

1. A pattern selecting device for a sewing machine that includes a memory storing data representing a plurality of different stitch patterns, the stored stitch patterns being selectively designated by a corresponding plurality of distinct pattern images, each one of the plurality of pattern images being specific to a corresponding one of the stored stitch patterns, the pattern selecting device comprising:

(a) a panel (2) mountable on a front side of a sewing machine;

(b) indicia means (3) including a plurality of images arranged in a row on said panel;

(c) display means (5) extending in parallel to said row of said images, said display means including a visible cursor (6) selectively movable into a plurality of positions each designating a corresponding one of said plurality of images;

(d) search means for selectively moving said cursor into said plurality of positions and including at least one search key (10a) operable for selectively moving said cursor in at least one direction along said row of said images so as to selectively designate said images by said cursor;

(e) input means for registering said selected image as designated by said cursor and for simultaneously displaying said selected image as a corresponding one of a plurality of symbols and including an input key; and (f) display drive means responsive to said search means for moving said cursor along said row of said images and for causing said display means to represent therein said selected image as designated by said cursor, said display drive means being responsive to a registration of a predetermined number of said symbols corresponding to said images to cause said display means to represent therein a stitch pattern stored in the memory and corresponding to said predetermined number of symbols.

2. The device as defined in claim 1, wherein said indicia means forms said images as digits and said input means forms said symbols as figures.

3. The device as defined in claim 1, wherein said search means includes another search key (10b) operable to move said cursor in a direction along said row of images that is opposite to said direction of said cursor movable by said first search key, said second search key also being operable for selectively designating said images by said cursor.

4. The device as defined in claim 1, wherein said display means is responsive to a position of said cursor designating a selected one of said images to represent therein said selected image in a form of a dot structure.

5. The device as defined in claim 1, wherein said indicia means further includes at least one stitch pattern to be selected, said display means representing said stitch pattern as said stitch pattern when designated by said cursor.

6. The device as defined in claim 1, wherein said display means includes therein another visible cursor (12) for indicating said represented indicia to be changed while said selected indicia is designated by said first mentioned cursor (6).

* * * * *